(12) United States Patent
Yamada

(10) Patent No.: US 6,565,042 B1
(45) Date of Patent: May 20, 2003

(54) EMERGENCY PARACHUTE

(75) Inventor: Takeo Yamada, Iwakura (JP)

(73) Assignee: Yamada Dobby Co., Ltd., Aichi (JP)

( * ) Notice: Subject to any disclaimer, the term of this patent is extended or adjusted under 35 U.S.C. 154(b) by 0 days.

(21) Appl. No.: 10/122,224

(22) Filed: Apr. 16, 2002

(30) Foreign Application Priority Data

Nov. 21, 2001 (JP) ..................................... 2001-356644

(51) Int. Cl.⁷ .............................................. B64D 17/02
(52) U.S. Cl. ..................................................... 244/145
(58) Field of Search .............................. 244/142, 145, 244/146, 902

(56) References Cited

U.S. PATENT DOCUMENTS 5,058,831 A * 10/1991 Takahashi .................... 244/142
5,303,883 A * 4/1994 Brewer et al. ............... 244/145
5,388,786 A * 2/1995 Hirose ...................... 244/138 R

* cited by examiner

Primary Examiner—Robert P. Swiatek
(74) Attorney, Agent, or Firm—Rader, Fishman & Grauer PLLC

(57) ABSTRACT

An emergency parachute 1 comprises an umbrellalike body 10 which has an outer cloth 11 and an inner cloth 12 and is formed as a bag, an inflator 15 which is inserted in an opening part 121 of the inner cloth 12 and fills a gas into the umbrellalike body 10, a suspension band 16 which holds a person, and a rope set 17 which couples the umbrellalike body 10 and the suspension band 16. The outer cloth 11 and the inner cloth 12 of the umbrellalike body 10 are coupled by a plurality of coupling cords 14, and when the gas is filled, the outer cloth 11 and the inner cloth 12 generate curved surfaces toward the same direction. Also the inflator 15 ignites an ignition device by pulling a tractive cord 30, and a gas producing agent within a gas producing chamber explodes and the gas is jetted from a jet.

4 Claims, 5 Drawing Sheets

EMERGENCY PARACHUTE

BACKGROUND OF THE INVENTION

1. Field of the Invention

The present invention relates to emergency parachutes and, more specifically, relates to an emergency parachute to be used in an emergency, for example, when a person escapes from an upper floor of a building.

2. Description of the Prior Art

Usually, a parachute is provided with an umbrellalike body, a falling body holding part a plurality of suspension bodies coupling the umbrellalike body and the falling body holding part, and an umbrellalike body opening device operable so that the umbrellalike body can be opened. The parachute is used for allowing a person or goods to float safely down from an aircraft in the sky.

On the other hand, a person working on an upper floor of a building must escape in an emergency from the upper floor of the building due to an earthquake, a fire or an unexpected accident. In the case that an emergency staircase can not be used, the person might escape from a window. If the person jumps down directly from the window, it might cause death and is quite dangerous. Therefore it has been desired, for example, for a person to float down using a parachute having a simple structure to be opened in a moment.

Moreover, since a parachute in the prior art is constituted for use in the high altitude, time is required to open such an umbrellalike body. Such time is considered to be longer than in a moment. Therefore when a person is allowed to float down from an upper floor of a building at low altitude using the parachute in the prior art, the person may collide with the ground due to the delay of the opening of the umbrellalike body. Therefore it is quite dangerous. Moreover since a space between buildings is narrow, the umbrellalike body may interfere with an obstacle or the like and therefore it does not descend to the ground.

SUMMARY OF THE INVENTION

In order to solve the above-mentioned problems, an object of the present invention is to provide an emergency parachute which can allow a person to escape at low altitude, for example, from an upper floor of a building.

An emergency parachute of the present invention comprises an umbrellalike body formed as a bag having an outer cloth and an inner cloth and capable of being filled with a gas in the inside so as to be opened or closed, gas producing means for producing the gas for filling the umbrellalike body, and suspension means having one end coupled with plural portions of a peripheral part of the umbrellalike body and other end having a falling body holding part.

The gas producing means has a gas producing agent, an ignition device for igniting the gas producing agent, and the ignition device for igniting the gas producing agent. The ignition device receives a signal from working means for supplying an ignition signal to the ignition device so it can be ignited by the ignition of the igniting device. The gas producing agent produces a gas which is filled within the umbrellalike body for opening the umbrellalike body.

Thereby in an emergency parachute of the present invention, an umbrellalike body is formed as a bag having gas producing means capable producing a gas, and the gas fills the umbrellalike body thereby the umbrellalike body can be opened. For example, when a person escapes from an upper floor of a building, if the working means is operated simultaneously with the person's falling, the ignition device of the gas producing means is ignited and the gas produced from the gas producing means fills the umbrellalike body in a moment. That is, since a structure body of an air bag is used to open the umbrellalike body, which can be opened in a moment and a person can fall on the ground safely.

Preferably since the outer cloth and the inner cloth are coupled by a plurality of coupling cords to connect both, the umbrellalike body with the gas filled therein falls in a state such that the inner cloth extends and generates the same curved surface as that of the outer cloth, thereby a stable failing state can be produced.

Also when the umbrellalike body is formed in a rectangular shape, the gas producing agent of the gas producing means jets the gas toward four apex parts of the umbrellalike body so it can be opened rapidly and stably.

Further when the umbrellalike body is formed in a circular shape, the gas producing agent of the gas producing means jets the gas toward at least the three directions equally divided of the outer circumferential part of umbrellalike body with good balance, and the umbrellalike body can be opened rapidly and stably.

EMBODIMENT OF THE INVENTION

An embodiment of the present invention will be described based on the accompanying drawings as follows. An emergency parachute in the embodiment provides a parachute capable of being opened in a moment in order to escape from an emergency at low altitude such as an upper floor of a building. In the embodiment described below, in order to open the parachute in a moment, a construction body of the parachute is utilized.

DESCRIPTION OF THE PREFERRED EMBODIMENTS

Figure 1:
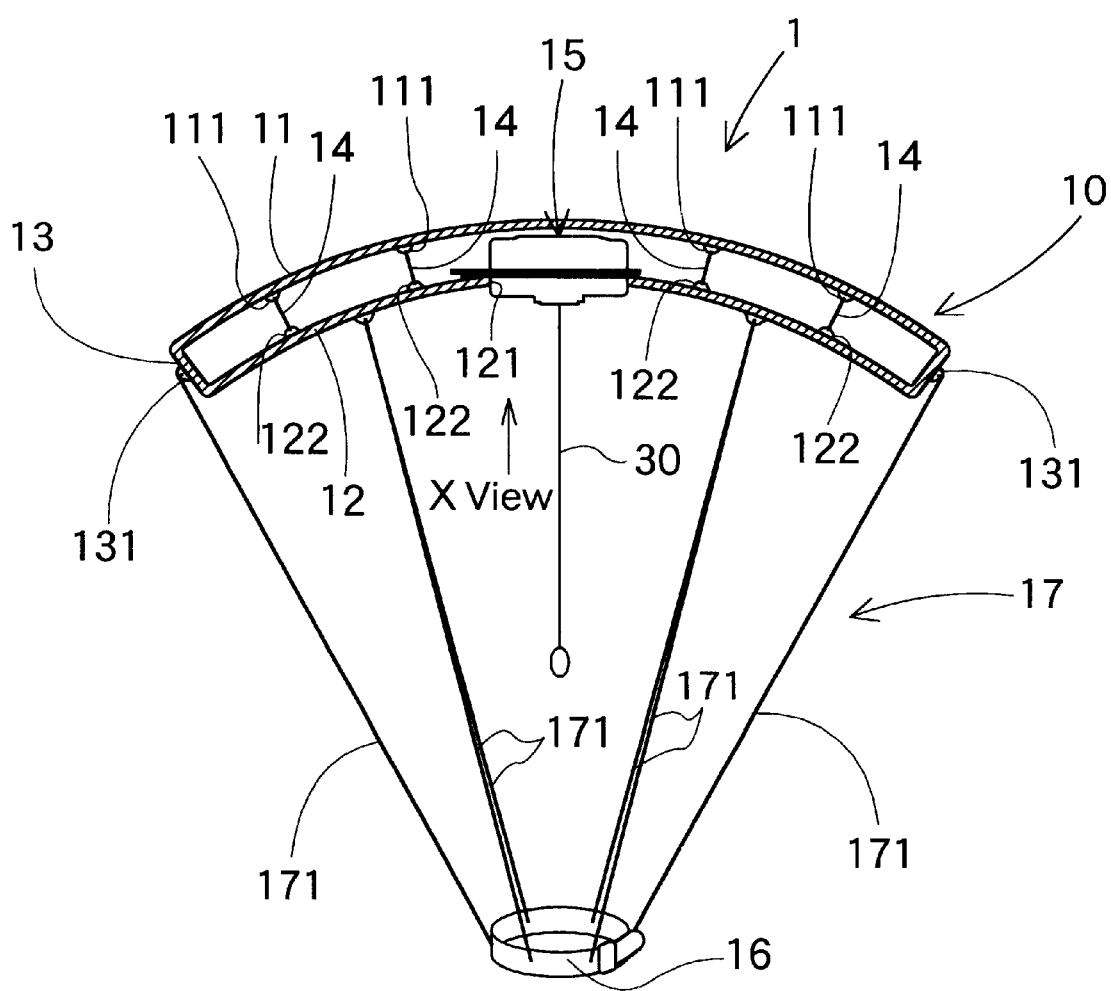
FIG. 1 is a sectional view showing a parachute according to an embodiment of the invention.
Figure 2:
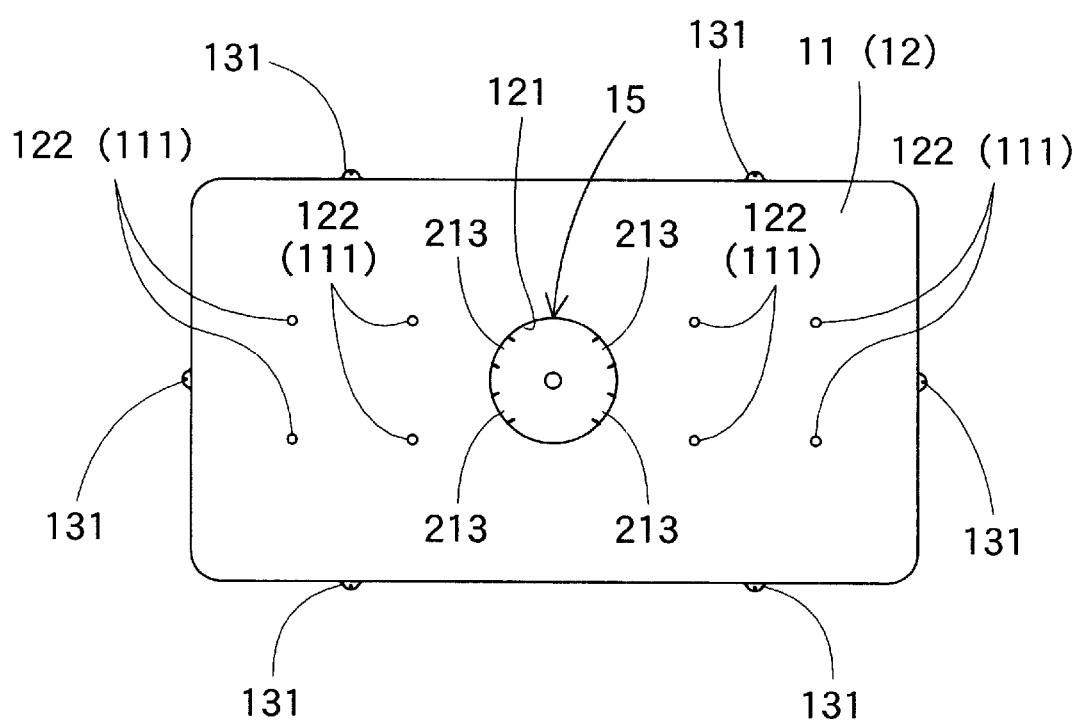
FIG. 2 is a view from X arrow in FIG. 1.

An emergency parachute (hereinafter referred to as "parachute") 1 in the embodiment, as shown in FIGS. 1 to 2, is provided with an umbrellalike body 10 formed as a bag and having an outer cloth 11 and an inner cloth 12, both made of nylon, connected through a side cloth 13, an inflator 15 as gas producing means inserted in an opening part 121 at a center part of the inner cloth 12, a falling body holding part 16 as suspension means to hold a person, and a rope set 17 comprising a plurality of ropes 171, as suspension means to connect the falling body holding part 16 and the umbrellalike body 10.

In addition, the opening part 121 arranged to install the inflator 15 is not limited to the center part of the inner cloth 12, but, for example, a plurality of opening parts 121 may be arranged at suitable positions in radial shape from the center part of the inner cloth 12, so that respective ones of a plurality of inflators 15 can be inserted in the opening parts 121 respectively. Also the opening part 121 arranged at the center part and a plurality of the opening parts 121 arranged at suitable positions in radial shape from the center part may be formed. Further on the opening part 121 arranged at the center part of the inner cloth 12, not one inflator 15 but a plurality of inflators 15 may be installed. However, considering the weight of the parachute 1, as shown in FIG. 1, it is preferable that one inflator 15 is arranged at the center part of the inner cloth 12.

Figure 3:
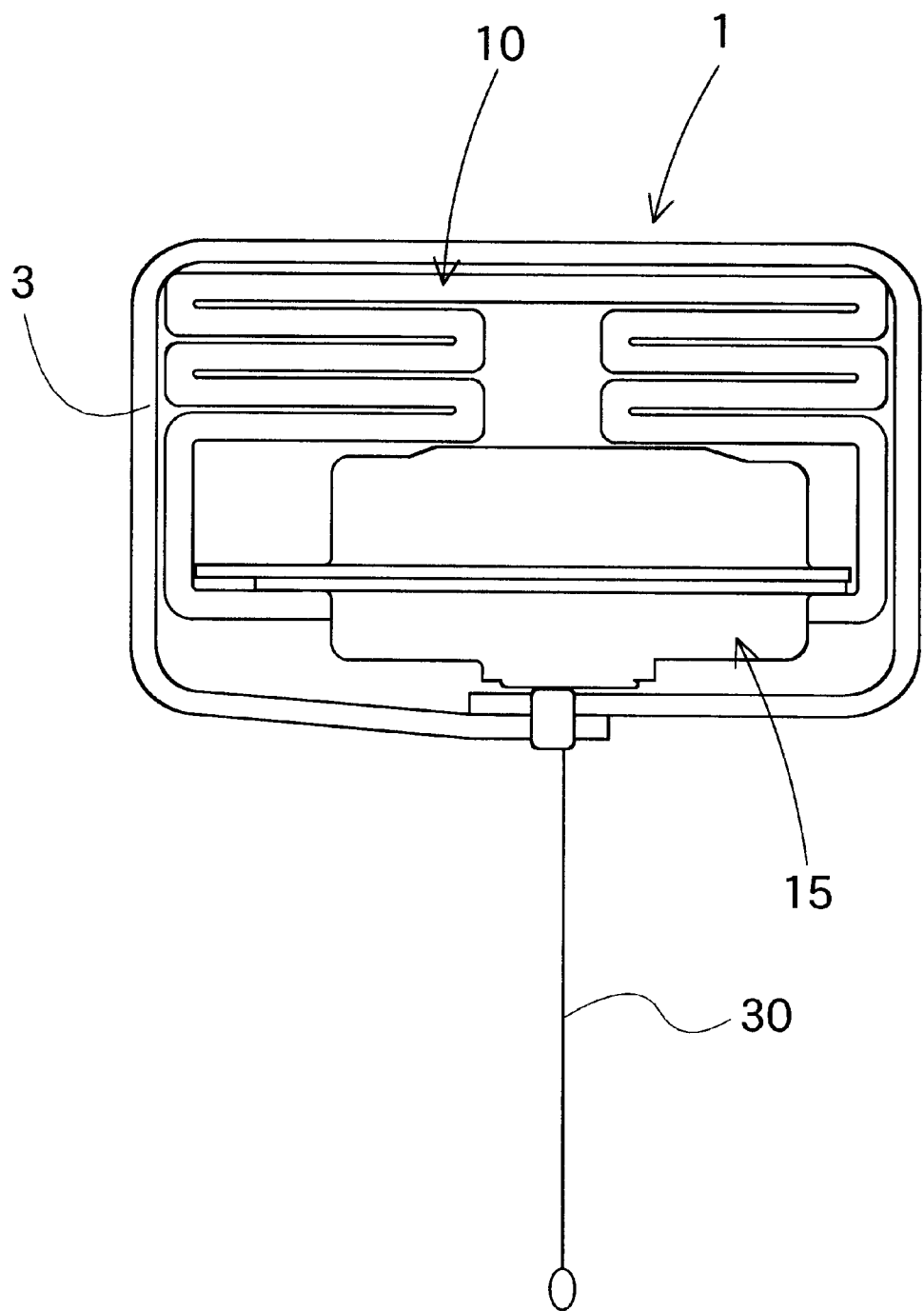
FIG. 3 is a sectional view showing the state that the parachute in FIG. 1 is folded.

The umbrellalike body 10 in a non-use state, may be folded as shown in FIG. 3 and may be locked together with the inflator 15 by a band 3. Otherwise, the umbrellalike body 10 may be sealed by a cover or the like made of poly vinyl chroride resin which can be easily broken when the pressure is applied, and when the umbrellalike body is opened, in the first embodiment, the umbrellalike body 10 is formed in rectangular shape. In the outer cloth 11 and the inner cloth 12, in order to avoid the state that when the umbrellalike body is opened, the inner cloth 12 extends in the reverse direction to the outer cloth 11, locking pieces 111, 122 are provided in plural positions of the opposite surfaces respectively, and the outer cloth 11 and the inner cloth 12 can be coupled with the opposite locking pieces 111, 122 by coupling cords 14. In addition, each of the outer cloth 11 and the inner cloth 12 may be formed by one sheet, but plural sheets of cloth may be overlaid on each other. Also the number of the coupling cords 14 is not limited as long as the outer cloth 11 and the inner cloth 12 can form the curved surfaces in the same direction with good balance, when the outer cloth 11 and the inner cloth 12 are opened.

Also a plurality of rope locking pieces (in the embodiment, two positions on one side in the longitudinal direction and one position on one side in the lateral direction) 131 are provided on the outer surface of the side cloth 13, and one end of a rope 171 made of nylon is locked to each of the rope locking pieces 131. Other end of each rope 171 is coupled with a hanging band 16 as the falling body holding part, thereby the rope set 17 as suspension means including the hanging band 16 is constituted. In addition, the mounting positions of the ropes 171 are determined so that the umbrellalike body 10 can be opened with good balance, and the number of the ropes 171 is not limited. Also the hanging band 16 as the falling body holding part is not limited to the above description, and in the case of a person, a hook capable of being locked to a band wrapped on the person may be provided, and in the case of goods, a winding band to bind the goods may be used.

Figure 4:
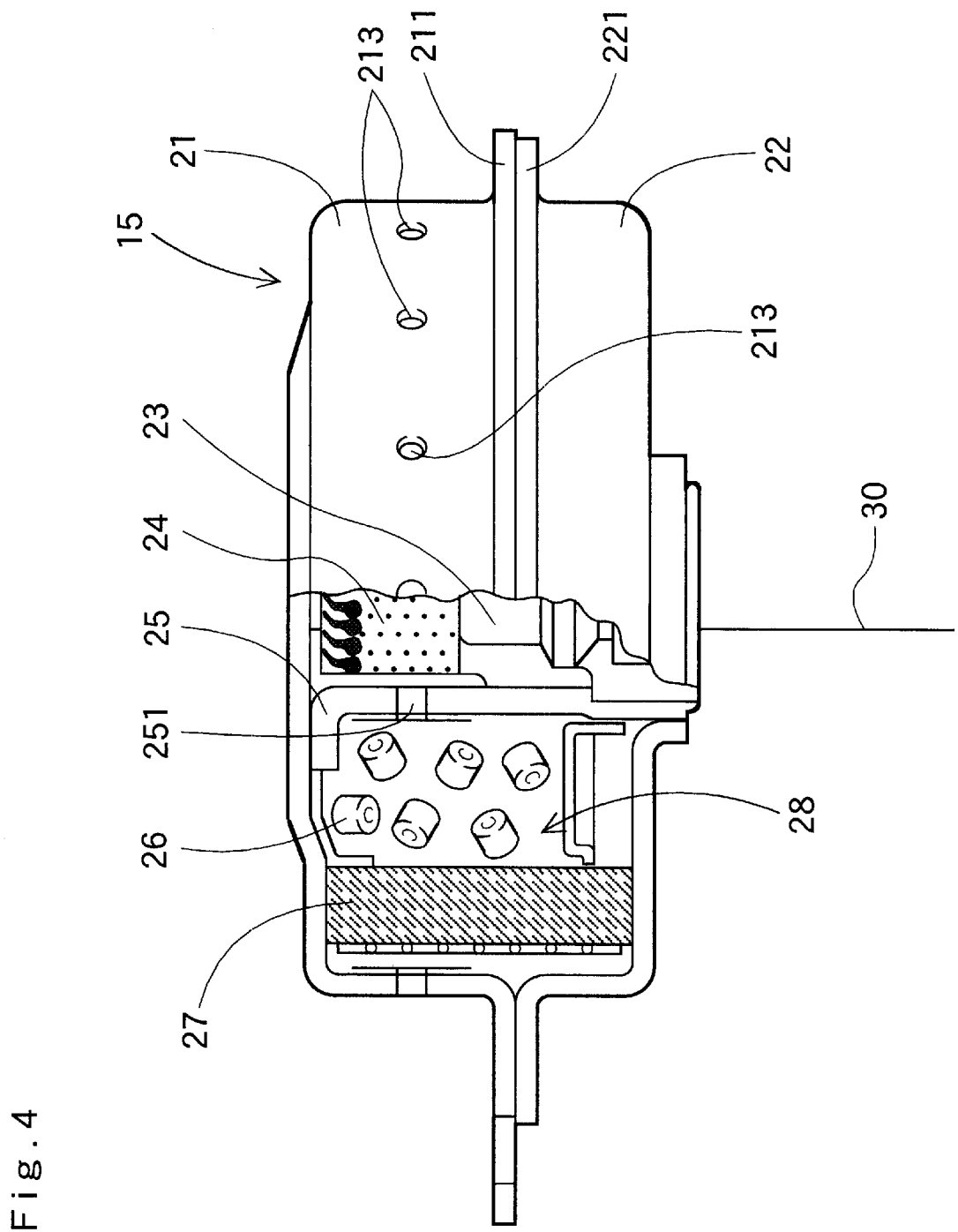
FIG. 4 is a fragmentary sectional view showing an embodiment of an inflator to be used in FIG. 1.

The inflator 15 in the embodiment constitutes the known gas producing device operated by the ignition system. That is, as shown in FIG. 4, the inflator 15 is formed in the cylindrical box shape where the upper surface and the lower surface are closed and the inside is made hollow. The inflator 15 is provided with the upper case 21 and the lower case 22 on which the flange parts 211 and 221 abut, and with an ignition device 23, an ignition agent 24 and a gas producing chamber 28, all arranged within a cylindrical plate 25. The gas producing chamber 28 encloses a gas producing agent 26 arranged around the outside of the cylindrical plate 25 throughout the entire circumference, and also encloses a filter 27 arranged around an outer circumference of the gas producing agent 26.

The upper case 21 is inserted from the opening part 121 formed at the center part of the inner cloth 12 of the umbrellalike body 10 into the hollow part of the umbrellalike body 10, and the side edge part of the opening part 121 of the inner cloth 12 is locked to the lower surface of the flange part 221 of the lower case 22. Thereby the inflator 15 and the umbrellalike body 10 are constituted integrally.

Also at a shell part 212 of the outer case 21, after the inflator 15 is installed to the umbrellalike body 10, jets 213 (in the embodiment, further plural jets are provided) are arranged so that the gas is jetted from at least four positions toward the four apex parts. In addition, when the gas is produced and jets into the umbrellalike body 10, it is preferable that the gas can be filled at the four corners so that the umbrellalike body can be opened in a moment.

The ignition device 23 is ignited by adopting known working means which operates by pulling a tractive cord 30. For example, as the working means, an ignition pin (not shown) arranged so as to thrust the ignition device 23, a drive shaft (not shown) arranged rockable so as to raise the ignition pin upward, and a tractive cord 30 pulling the drive shaft at one end, may be used. In addition, constitution of the ignition device may be that adopting another known structure in the prior art, as long as it can be pulled by the tractive cord 30.

Next, action of the parachute 1 in the above-mentioned constitution will be described.

While a worker performs work at an upper floor of a building, if an unexpected accident, for example, an earthquake, a fire or the like, occurs therefore he can not descend to a lower floor by an elevator, a staircase, an emergency staircase or the like, he takes out an emergency parachute 1 prepared and located on each floor. In this case, if the parachute 1 is locked by the band 3, the band 3 is removed, and if the parachute 1 is wrapped in a vinyl cloth, it is taken out of the wrapped state. After the hanging band 16 is wound on and fastened to his waist, he jumps down from a window while carrying the parachute 1. At the same time that he jumps down, the tractive cord 30 is pulled.

The tractive cord 30 is pulled, thereby the drive shaft as working means (not shown) raises the ignition pin and thrusts the ignition device 23 thereby ignition is performed. Ignition fire is transmitted by a fire transmission agent from a plurality of coupling holes 251 formed on a cylindrical plate 25 to the gas producing chamber 28. The ignition fire is transmitted to the gas producing chamber 28 thereby the gas producing agent 26 explodes and the gas is jetted from a plurality of jets 213 to a hollow part within the umbrellalike body 10. The umbrellalike body 10 is opened in that the gas is filled between the outer cloth 11 and the inner cloth 12. Since the jets 213 are arranged so that the gas is jetted in at least four positions toward the four apex parts, the gas is filled in the four corners of the umbrellalike body 10 in a moment.

In this case, since the outer cloth 11 and the inner cloth 12 are coupled by the coupling cord 14, when the gas is filled, the outer cloth 11 and the inner cloth 12 are not separated from each other, and the inner cloth 12 is curved along the outer cloth 11 curved upward thus both the outer cloth 11 and the inner cloth 12 are curved upward.

In addition, in the period from the pulling of the tractive cord 30 until the opening of the umbrellalike body 10, since these series of actions are performed in similar action to the air bag device conventionally used in vehicles, the actions are performed in a moment.

Consequently a worker is held by the opened umbrellalike body 10 and the rope set 17 suspended to the umbrellalike body 10, therefore he can descend to the ground safely by a parachute reducing the descending speed of the worker by air resistance.

In the parachute 1 in the embodiment as above described, the umbrellalike body 10 is provided with the inflator 15 and is formed as a bag in which the gas can be filled, therefore the umbrellalike body 10 can be opened by the gas filling it. For example, when a person escapes from an upper floor of a building, he pulls the tractive cord 30 simultaneously with the falling thereby the gas can fill the umbrellalike body 10 in a moment. That is, since the known structure body of the air bag is used to open the umbrellalike body 10, which can be opened in a moment, a person can descend to the ground safely.

Also since the outer cloth 11 and the inner cloth 12 of the umbrellalike body 10 are coupled by the coupling cord 14, the umbrellalike body 10 with the gas filled therein falls in the state that the outer cloth 11 and the inner cloth 12 extend in the same direction and generate the same curved surface. Consequently a stable falling state can be produced.

Further in the umbrellalike body 10 formed as a rectangular bag, the gas is jetted toward the four apex parts of the umbrellalike body 10, thereby the umbrellalike body 10 can be opened rapidly and stably.

In addition, the parachute in the present invention is not limited to the above-mentioned embodiment. For example, the gas producing means need not be the structure body of the known inflator, but may be arbitrarily constituted as long as the gas producing agent explodes in a moment and the gas fills in the umbrellalike body. Also the working means to ignite the ignition device need not be that in the mechanical ignition system using the tractive cord, but may be constituted so as to ignite using an operation button and a sensor.

Figure 5:
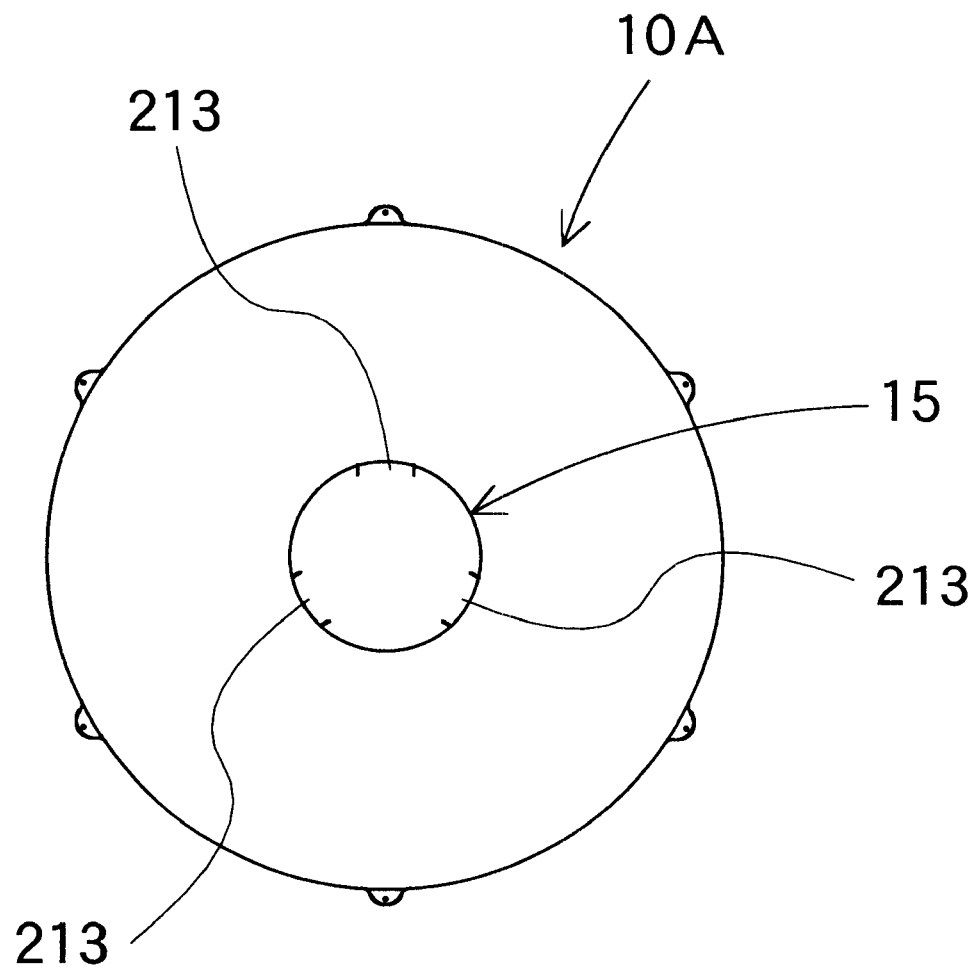
FIG. 5 is a plan view showing another embodiment of an umbrellalike body in the parachute in FIG. 1.

Further the umbrellalike body 10 need not be rectangular body 10A but a circular bag shape in the second embodiment as shown in FIG. 5. In this case, in the gas producing means, the above-mentioned inflator 15 may be used and jets 213 formed in a shell part 212 of the upper case 21 are preferably arranged equally at least in the three directions since the umbrellalike body can be opened keeping its balance.

What is claimed is:

1. An emergency parachute, wherein (a) the emergency parachute comprises an umbrellalike body which has an outer cloth and an inner cloth and is formed as a bag with the inside to be filled by a gas and which can be opened or closed, gas producing means for producing a gas to fill the umbrellalike body, and suspension means whose one end is coupled with plural positions of a peripheral part of the umbrellalike body and whose other end has a falling body holding part, (b) the gas producing means has a gas producing agent and an ignition device which can be ignited on receiving a signal from working means supplying an ignition signal to the ignition device, (c) the gas producing agent produces a gas by igniting the ignition device, and the gas fills the umbrellalike body thereby the umbrellalike body is opened.

2. An emergency parachute as set forth in claim 1, wherein the outer cloth and the inner cloth are coupled by a plurality of coupling cords connecting both.

3. An emergency parachute as set forth in claim 2, wherein the umbrellalike body is formed in rectangular bag shape, and the gas producing agent of the gas producing means jets a gas toward the four apex parts of the umbrellalike body.

4. An emergency parachute as set forth in claim 2, wherein the umbrellalike body is formed in circular bag shape, and said gas producing agent of the gas producing means jets a gas toward at least three directions equally divided of an outer circumferential part of the umbrellalike body.

* * * * *